Patented Mar. 10, 1925.

1,529,260

UNITED STATES PATENT OFFICE.

SIMON JOSEPH LUBOWSKY, OF JERSEY CITY, NEW JERSEY.

METHOD OF SEPARATING IMPURITIES FROM SOLUTIONS OF TIN SALTS.

No Drawing.      Application filed March 1, 1923.    Serial No. 622,207.

*To all whom it may concern:*

Be it known that I, SIMON J. LUBOWSKY, a citizen of the United States, and a resident of Jersey City, in the county of Hudson and State of New Jersey, have invented certain new and useful Improvements in Methods of Separating Impurities from Solutions of Tin Salts; and I do hereby declare the following to be a full, clear, and exact description of the invention, such as will enable others skilled in the art to which it appertains to make and use the same.

The invention relates to a novel method of separating impurities from solutions of tin salts, said impurities usually occurring in the form of flocculent or finely divided solid material which is held in suspension in the solution and renders the latter very difficult of separation by the usual methods of filtration. The present invention involves the production in the tin solution of a precipitate, or addition, flocculent in character but of high specific gravity, which will entrain and carry down with it the suspended impurities.

A common method of producing solutions of tin salts, which are later worked up into various tin products for commercial and technical uses, is to treat scrap tin plate with various chemicals which will dissolve off the tin without attacking the ferrous metal underneath to any appreciable extent. One disadvantage in the use of such solutions, as heretofore employed, is that they carry iron rust and other solid impurities, in very finely divided form, in suspension. It has been customary to attempt to remove these suspended solid particles in tin solutions by permitting the solutions to stand quiescent for a long time, so that the solid particles will gradually settle to the bottom of the container, after which most of the supernatant tin solution may be decanted. This mode of separating the impurities has proven unsatisfactory, not only because the finest particles do not settle, but remain in suspension indefinitely, but also because of the very slow rate of settling of the comparatively coarse solid particles.

I have found that if in such a mixture of solutions and suspensions a flocculent precipitate of high specific gravity is produced, by the addition of suitable chemicals, or, if a flocculent suspension of high specific gravity is produced by the mechanical addition of suitable materials, then, in such cases, the heavy flocculent precipitate, or the heavy flocculent suspension added mechanically, settles rapidly and carries down with it all other materials in suspension in the initial solution. In such cases, when the supernatant solution of tin salts is decanted, it is found to be entirely free from the solid material originally in suspension therein, and, therefore, suitable for production of tin salts of a greater degree of purity than it has been possible to produce heretofore from tin solutions obtained by the ordinary commercial modes of detinning scrap and similar operations.

One method of producing a flocculent precipitate of high specific gravity is to add only sufficient precipitant to throw down, in the form of hydrated oxide of tin, a relatively small portion of the tin in solution. A suitable material to be added mechanically to the tin solution to effect the same result, is hydrated metallic oxide, as for example, oxide of iron, oxide of aluminum, oxide of magnesium and the like, in flocculent form, which constitutes, when added to the tin solution, a flocculent suspension of high specific gravity which settles quickly, carrying with it all of the solid material in suspension.

While these alternative methods have proven to be entirely satisfactory, it is to be understood that the invention is not limited specifically thereto, but contemplates the introduction in the tin solutions of a flocculent material of high specific gravity, whether the same be in the form of a precipitate formed within the solution or in the mechanical addition to the solution of such flocculent material.

What I claim is:

The method of separating solid material in suspension from solutions of tin salts which comprises forming a hydrated oxide of tin in the solution of tin salts to carry down the suspended matter, and then withdrawing the supernatant liquid.

In testimony whereof I affix my signature.

SIMON JOSEPH LUBOWSKY.